(12) United States Patent
Statnikov

(10) Patent No.: US 6,171,415 B1
(45) Date of Patent: Jan. 9, 2001

(54) ULTRASONIC IMPACT METHODS FOR TREATMENT OF WELDED STRUCTURES

(75) Inventor: Efim S. Statnikov, Arkhangelsk Region (RU)

(73) Assignee: UIT, LLC, Birmingham, AL (US)

( * ) Notice: Under 35 U.S.C. 154(b), the term of this patent shall be extended for 0 days.

(21) Appl. No.: 09/145,992

(22) Filed: Sep. 3, 1998

(51) Int. Cl.$^7$ .................. B23K 20/10; C21D 10/00
(52) U.S. Cl. ............... 148/525; 148/558; 228/110.1
(58) Field of Search .................. 148/585, 558; 228/110.1

(56) References Cited

U.S. PATENT DOCUMENTS

| | | |
|---|---|---|
| Re. 16,599 | 4/1927 | Mattice . |
| 1,703,111 | 2/1929 | Kniatt . |
| 1,770,932 | 7/1930 | Leake . |
| 2,537,533 | 1/1951 | Ingalls ............................ 29/148 |
| 3,274,033 | * 9/1966 | Jacke ............................ 148/558 |
| 3,622,404 | * 11/1971 | Thompson ..................... 148/558 |
| 3,961,739 | 6/1976 | Leftheris ........................ 228/110 |
| 4,049,186 | 9/1977 | Hanneman et al. ............. 228/225 |
| 4,330,699 | 5/1982 | Farrow ...................... 219/121 LD |
| 4,624,402 | 11/1986 | Pitcairn et al. ................. 228/119 |
| 5,654,992 | 8/1997 | Uraki et al. .................... 376/260 |

FOREIGN PATENT DOCUMENTS

| | | |
|---|---|---|
| 2662180 | * 11/1991 | (FR) . |
| 683873 | * 9/1979 | (SU) . |

OTHER PUBLICATIONS

E.Sh. Statnikov, V.I. Trufyakov, P.P Mikheev and Yu, F. Kudryavtsev Specification for Weld Toe Improvement by Ultrasonic Impact Treatment IIW Document XIII–1617–96.

V.I. Trufyakov, P.P. Mikheev and Yu.F. Kudryavtsev, E.S. Statnikov Ultrasonic Impact Treatment of Welded Joints IIW Document XIII–1609–95.

E.Sh. Statnikov, V.I. Trufyakov, P.P. Kikheev and Yu. F. Kudryavtzev Comparative Evaluation of Efficiency and Adaptability to Fabrication of Postweld Deformation Methods of Improving Fatigue Resistance of Welded Joints IIW/IIS–Doc. XIII–1668–97.

* cited by examiner

Primary Examiner—George Wyszomierski
(74) Attorney, Agent, or Firm—Breiner & Breiner

(57) ABSTRACT

This invention provides methods of treatment for welded products by pulse impact energy, preferably ultrasonic, at original production, during the active life period for maintenance and after failure in a repair stage to improve the strength at the weld sites and to fashion stress patterns that reduce stress centers and micro-stress defects. The basic method steps are nondestructive in nature, inducing interior pulse compression waves that temporarily plasticize the metal to relax stresses and redistribute stress patterns in a gradient of metallic grain structure between a higher strength substantially grainless white layer at the weld seam to an internal base metal region in the welded body. Thus, a renewed longer life span and higher strength weld joint regions are generated in welded products.

15 Claims, 2 Drawing Sheets

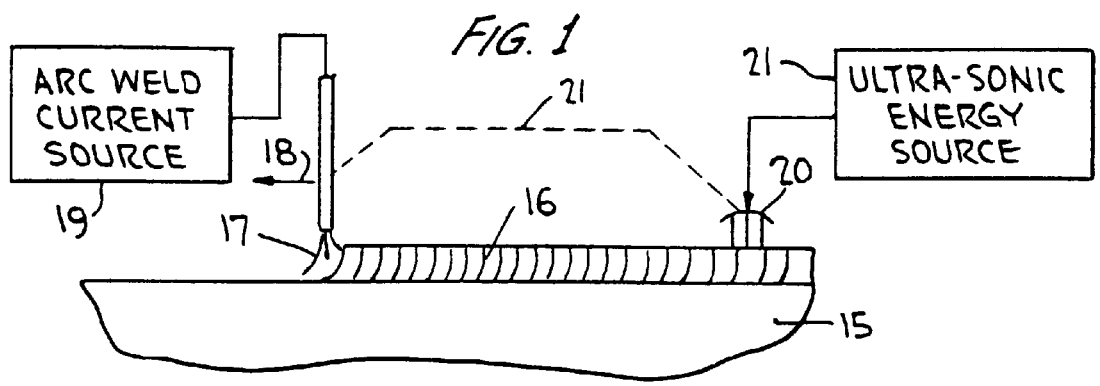
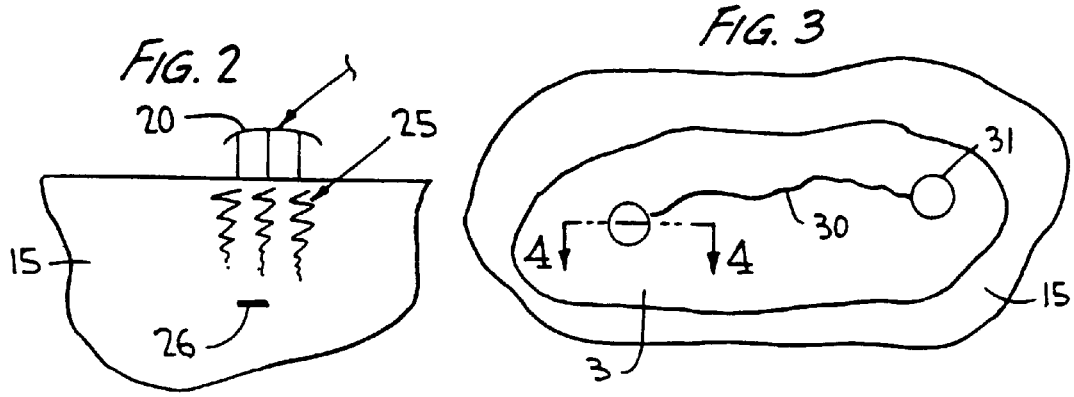
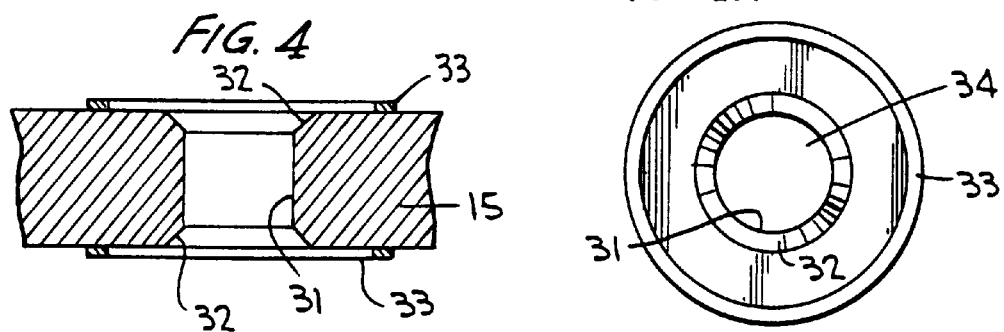
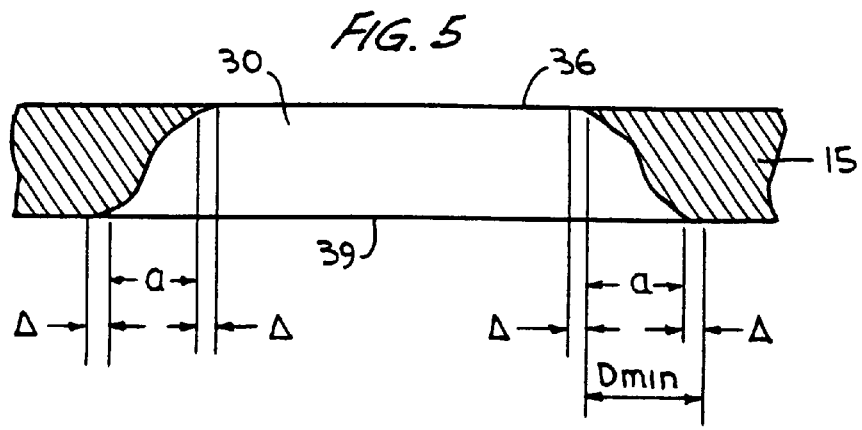

ULTRASONIC IMPACT METHODS FOR TREATMENT OF WELDED STRUCTURES

TECHNICAL FIELD

This invention relates to periodic impulse energy impact methods and systems for treatment of welded products and more particularly it relates to procedures and apparatus for the application of impact energy ultrasonically to welded product external surfaces in the vicinity of welding sites to reduce, avoid or distribute stresses tending to cause structural fatigue and failures in the welded products.

BACKGROUND ART

In the welding arts, the initial manufacturing process, the after-manufacture treatment of the welded product, and the encountering of and the magnitude of loads in use and the aging process cause deteriorization of load bearing strength in the structure of the materials, whether unseen without destructive analysis or evidenced by catastrophic failure, such as by appearance of fractures or cracks. This invention is directed to procedures that remove defects in the material structure and that improve performance of the welded product by relieving stress centers and stress patterns about weld seams, thereby to improve load carrying capacity, life of service and stability of parameters.

Conventional welded products are made by employment of various welding art technological operation steps before and after the actual welding step in an attempt to improve the working life of the products. Some of these steps are typified by (a) pre-welding preparation of exposed surfaces at welding sites by abrasive or chemical cleaning, (b) post-welding processing of welded seams by cleaning flux and slag and by surface shaping to remove visible sharp projections and contours that identify concentrated stress areas, (c) surface treatment of the welded structure with corrosion resisting coatings and (d) thermal tempering and demagnetizing treatments for internally restructuring the metal grain in a manner reducing the influence of stress concentrations.

Because of the interactions of the various independent steps typically occurring at various times on welded metal products, particularly in view of various intricate product shapes and loading patterns, and the difficulties in detecting defective subsurface base material patterns such as grain structure and stress centers in the welded product that affect fatigue, life and strength of welded joints and associated zones, results of combatting fatigue with various technical operations heretofore available in the prior art have been substantially erratic and unpredictable thus producing low quality products inconsistent in expected performance.

At this stage of the prior art, a number and variety of interacting technical operations in a series of processing steps in initial production are necessary to prepare respective welded metal products with greater load bearing capacity and lower internal stresses for longer expected life cycles. Simplification and lower cost of the production process is thus highly desirable, as well as improved performance.

Also current welded metal product production practices require the addition and removal of materials which therefore are consumed in the manufacturing process. For example overlay welding and beading operations for strengthening weld seams require more initial metal and require additional technical operations such as mechanical grinding, removal of fluxes, and thermal tempering. It has not been feasible to obtain optimum strength and life in welded products without such steps.

It is conventional to retire and replace aging welded structures such as steel bridgework for stress corrosion, stress fatigue and the presence of observable cracks. It is therefore desirable to provide improved maintenance and repair technology to renew useful life by restoring initial load bearing strength and relieving stress fatigue so that current structures may be kept in operation.

In the welding arts conventionally in practice, technology has not been available which is well adapted for in-use non-destructive and non-deforming repairs to restructure and restore welded products that have become overloaded from aging, that have reduced loading capacity because of stress fatigue or which have catastrophically failed by cracking or the like.

For example, the prior art ability to repair visible catastrophic failures of structure, evidenced by cracks or fractures, in most part is limited to the addition of supporting braces, crutches, and other types of overlying structure to bypass the damaged zones. Such techniques are not suitable for many utilities where there is either no accessible place to rework the welded products in-situ, where restrictions in space are imposed or where appearance of such bypassing structure is intolerable.

Accordingly it is an objective of the present invention to correct such foregoing defects of the prior art.

Examples of typical prior art technology related to the invention or teaching some of the underlying methodology merged to produce the novel combination of technologies as a whole involved in the present invention, now are set forth.

Overlay technology exists wherein strengthening elements are superimposed over critical zones to bypass fatigued, fractured or other deficient welded product structure. The overlay may be superimposed directly upon weld seams in some cases. Typical examples of this technology are U.S. Pat. No. 2,537,533, G. E. Ingalls, Jan. 9, 1951; RE 16,599 R. Mattice, Apr. 19, 1927; U.S. Pat. No. 1,703,111, S. J. Kniatt, Feb. 26, 1929; and U.S. Pat. No. 1,770,932, A. G. Leake, Jul. 22, 1930. Such overlay structure in U.S. Pat. No. 4,049,186, R. E. Hanneman, et al., Sept. 20, 1977 and U.S. Pat. No. 4,624,402, D. Pitcairn, et al., Nov. 25, 1986 in particular disclose overlay welds for the purpose of preventing stress corrosion failures in the welded body.

Peening by means of pellets, hammers, stress waves and ultrasonic impact is known to surface treat and deform the welded body surface structure for contouring weld sites and heating the metal for thermal tempering effects. Typical art of this nature includes U.S. Pat. No. 5,654,992, K. Uraki, et al., Aug. 5, 1997 and U.S. Pat. No. 3,961,739, B. P Leftheris, Jun. 8, 1976. These disclosures recognize that mechanical pressure and stress waves applied to the external surface of a body creates thermal energy and a momentary state of plasticity in the workpiece.

In U.S. Pat. No. 4,330,699, M. M. Farrow, May 18, 1982, a non-contact laser welder is accompanied by a second amplitude modulated laser for generating acoustic waves in the melt to improve interdiffusion and homogeneity of the weld joint.

I have authored or co-authored several publications relating to ultrasonic impact treatment of welded joints and the relationship to fatigue resistance, typically as reported in the following International Institute of Welding IIW Documents:

Publication XIII-1617-96 for example discloses that the fatigue strength of as-welded joints was increased by changes in mechanical properties of material in surface layers induced by ultrasonic impact treatment (UIT). Thus, the material at the weld toe is compressed and deformed by manual indentation using an ultrasonic probe to form indented groove structure smooth and free from irregularities. This technique depends upon the training and skills of an operator manually wielding an ultrasonic probe to form the grooves, and requires reshaping of the weld site.

The comparison of peening with UIT is discussed in Document XIII-1668-97, which sets forth the advantages of ultrasonic technology over peening, and the practicability of UIT technology to compress and indent the welded body structure in the vicinity of the weld seam.

The use of ultrasonic hand tools for achieving foregoing compression indentations is set forth in Document XIII-1609-95.

These techniques have demonstrated significant increases in fatigue limits of welded structures. However, this prior art technology requires physical distortion of the welded product or structure, and demands skilled labor to make decisions on the nature of indentations in the presence of different physical shapes of welded bodies and different loading requirements at the weld sites. Thus, it is neither practical nor economically feasible to apply the techniques universally to welded products of various sorts. Furthermore there can be no consistency from one product to another to assure constant quality performance expectations. Nor can this technique, provided for initial production cycles only, be used for later maintenance of welded products or for repairs of cracks and catastrophic failures.

The present invention has the objectives of curing defects and deficiencies in the aforementioned type of prior art, and offering significant advantages in simplifying processing steps and improving useful life span and higher loading capacities of welded products at various stages of life throughout the initial production of the product and even after catastrophic failures appear such as visually observable cracks.

A significant objective of the invention is to coordinate and combine non-destructive ultrasonic impact treatment of welded products without deforming shape applicable to manufacturing, maintenance and repair process stages for relaxing fatigue resistance, improving corrosion fatigue strength and durability of welded joints, and creating uniformly distributed stress gradient junctions between welding seams and the internal base metal in target areas of a welded joint.

Another objective of the invention is to reduce material consumption during welding while reducing the processing time and increasing the performance and life of welded products by replacing or eliminating various required technical operations of the prior art in the production, maintenance and repair of welded products such as grinding and surface shaping.

A more specific objective of the invention is to produce quality welded joints with consistently controlled stress distribution patterns that substantially increase useful lives and working strengths of welded products in a manner not heretofore feasible.

SUMMARY OF THE INVENTION

The long sought after realization of creating at will in welded metal bodies "white layers" without substantial evident grain structure in the vicinity of weld seams is achieved by this invention. It is well known that this crystalline structure provides fewer internal micro-stress defects usually found at grain boundaries, and considerably improves load carrying strength, while reducing stress fatigue aging.

Reduction of stress defects and redistribution of internal stress patterns in the vicinity of weld seams are achievements of this invention. Such results are achieved by periodic pulse energy impact treatment with skin surfaces in welded products to induce internal compression waves inducing a metal plasticity state in the vicinity of the weld seam.

Applied pulse energy creates compression waves within the plastic body in a manner creating a tapered gradient stress pattern between a weld junction and a base metal site in the product body. This removes stress defects and unpredictable or uncontrolled stress patterns that reduce overall product load bearing capabilities and introduce zones susceptible to failure and fatigue. For optimum effectiveness the impact treatment is preferably ultrasonically induced.

This treatment procedure replaces several technical operation steps required in the prior art production stage to simplify and lower cost of the treatment of welded bodies, while improving strength and life and reducing the amount of required metal consumption in the welding process. For example, the application of pulse wave impact energy replaces such technological operations as thermal and quenching treatment steps generally requiring a furnace, overlaying auxiliarly welds to increase the loading capability of a weld joint, mechanical steps of chamfering weld seams to relax internal stresses, peening, attachment of bracing plates, and the like.

Novel process steps and improved welded structures afforded by this invention for treating welded products is illustrated in the particular technological operational embodiment of repair of a crack in a welded body.

In general, this invention corrects prior art deficiencies by reworking the internal micro structure of the welded materials in various phases of production, maintenance and repair to relax and redistribute structural stress patterns in the vicinity of a weld. This procedure eliminates or minimizes critical stress patterns or concentrations that reduce life and load bearing capabilities of the product. Thus, the application of the ultrasonic impact technology afforded by this invention replaces several prior art technical operations and serves to improve the load bearing capabilities of the welded product and the reduction of stress concentration centers that lead to fatigue, stress corrosion and catastrophic failure.

This invention provides novel methods not heretofore available in the art to prevent micro structure damage and fatigue cracks at initial stages of operation, particularly in post-welding treatment of the weld site.

Further it provides novel repair methods without the high processing costs which effectively eliminate stress center defects introduced in prior art sequentially applied technical operations such as stripping and shaping of surfaces, beading and strain hardening procedures such as bending and thermal treatment.

By the technology of this invention therefore novel welded product structures are produced with greater load bearing capabilities and reduced stress concentrations that lead to deterioration, fatigue and catastrophic failures.

Thus, in accordance with this invention, an ultrasonic impact technology (UIT) non-destructive surface treatment step creates states of plasticity in the vicinity of welds in welded bodies with compressive wave patterns that relax stresses and introduce a stress gradient pattern significantly strengthening the weld site. The resulting internal gradient micro-structure patterns in the welded body avoids micro stress concentration boundaries usually centered about the metallic grain structure in the vicinity of welds. This results in welded products with longer life and higher load bearing capacity. Such UIT treatment steps are useful during initial product manufacture, maintenance operations, and treatments of stress fatigue or catastrophic failure to restore life.

In the technical operation of repair of a crack, the invention is characterized by the basic method steps of UIT treatment as supplemented by the mechanical deformation steps of chamfering sharp edges and the additional steps of welding bracing structure onto the welded product as a further vehicle for relaxing internal residual stress defects and influencing dynamics of crack formation and development. In a typical embodiment of the invention, a UIT transducer head is spaced on the surface of a welded product at a predetermined distance from the welding arc presenting a temperature considerably cooler than the welding temperature. In this relationship the ultrasonic transducer head concurrently tracks the welding arc, and thus creates along the weld seam a stress gradient pattern which penetrates the welded product body deep enough to relieve stress concentrations otherwise formed during the welding step.

Other objects, features and advantages of the invention will be found throughout the following description and claims.

BRIEF DESCRIPTION OF THE DRAWINGS

In the accompanying drawings, wherein like reference characters indicate related features throughout the various views:

FIG. 1 is a block diagram representation of a system embodiment of this invention for treatment of welded structures with ultrasonic impact energy;

FIG. 2 is a hypothetical waveform sketch illustrative of the manner of distribution of compressive wave energy interior of a welded product being treated by ultrasonic impact energy pulses;

FIG. 3 is a diagrammatic sketch plan view of a crack formed in a welded product surface having holes drilled near the ends of the crack for alleviating the tendency of the crack to spread;

FIG. 4 is a cross section side view in section designating a preferred area of application of ultrasonic impact energy, and further illustrating the chamfering of edges of the crack in the vicinity of holes drilled at an end of the crack looking into lines 4—4 of FIG. 3;

FIG. 4A is a top view of the FIG. 4 configuration showing the insertion of a plug into the hole after chamfering of the surface edges of the hole;

FIG. 5 is a diagrammatic side view, as if looking into an air gap positioned in a welded product body between crack walls;

THE PREFERRED EMBODIMENTS

Figure 6:
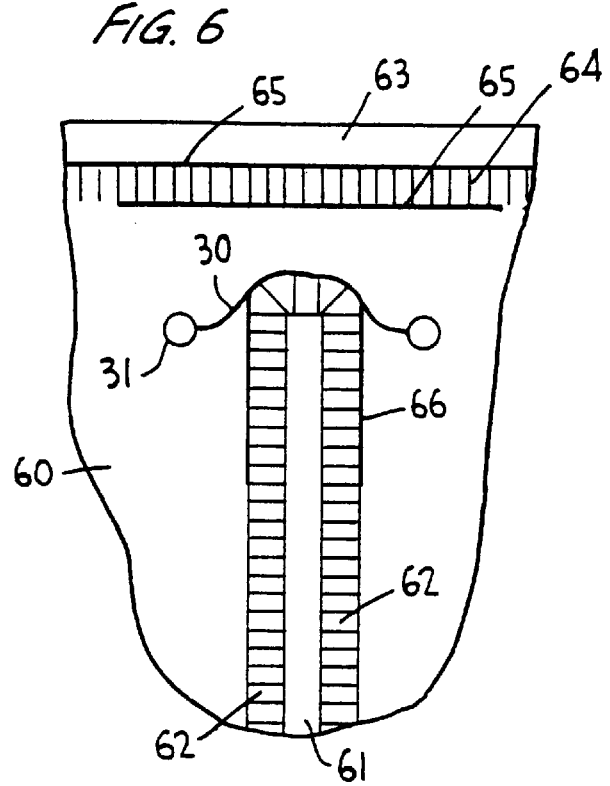
FIG. 6 is a diagrammatic plan view of a fragment of a welded body panel such as a bridge girder with upper flange welded thereon, displaying a crack in the panel, and the nature of repairs made to the welded body in accordance with the teachings of this invention.

In FIG. 1 it is seen that a weld seam 16 is being laid down on the welded product body 15 surface at the arc 17, which is moving to the left as indicated by arrow 18. Appropriate arc energy is derived from the current source 19. In accordance with this embodiment of the invention, an ultrasonic transducer head 20, powered from the ultrasonic energy source 21 is moved along the weld seam in tandem with the movement of the arc in direction 18, as indicated by the dotted line 21.

The frequency and magnitude of the ultrasonic energy induced into the welded product body is selected to nondestructively contact an exterior surface of the welded product body 15 to induce compressive waves in the body and create a zone of plasticity without substantial mechanical deformation or removal of surface material. At the arc 17 there is a high temperature, typically 900 degrees C, and a substantially cooler residual temperature, typically 100 degrees C, prevails at the transducer head 20.

As seen from FIG. 2, the internal compression wave notation 25 indicates the objective of this invention to induce internal ultrasonic energy compression waves for treatment of the metal in the vicinity of and including a weld seam junction, without deforming the surface of the body 15. In the resulting compression waves 25, the compression wave energy at the surface has the highest amplitude and as the distance away from the surface increases the amplitude decreases in a gradient pattern.

By creating a temporary plasticity of the welding body metal with impact pulse wave energy in a way similar to that described in Leftheris, 3,961,739, supra, internal stresses in the treatment zone are relaxed and redistributed. Thus, in the vicinity of the weld seam, near the external surface of the welded body, grain structure, commonly visible in steel cross sections, is substantially converted to grain free structure, generally termed "white layer", which has the property of significantly higher strength. That strength coupled with the feature of this invention that the pulse energy treatment provides a stress gradient toward a base point 26 inside the base metal of the workpiece thus produces a metallic grain structure gradient which in effect relaxes internal micro-stress centers that tend to concentrate at grain boundaries and eliminates significant grain boundary steps over the gradient range which is characteristic of the workpiece metal after the ultrasonic wave energy is removed and the temporary plastic state is terminated.

This procedure in a welded product results in greater load bearing capacity and greater resistance to fatigue stresses encountered during the service life of the product. Furthermore the procedure provides a technique that is not only useful in the production phase, but also is applicable for maintenance while in service to remove residual stress conditions tending to cause stress fatigue and to restore and improve the load bearing capacity. In addition should catastrophic failures such as cracks or fractures develop, this procedure provides a tool to repair in situ a welded product such as a bridge strut or girder, and in the process restoring the work product to new life, usually with improved strength and fatigue life.

Thus, this invention introduces to the art the nondestructive, non-indentation method of treating a welded metal product to increase its load bearing life and strength at the time of initial welding requiring a minimum of steps or technical operations, namely:

inducing pulse impact energy nondestructively at the exterior surface of a welded product in the vicinity of a seam being welded at a site on the welded product exterior surface where the temperature is substantially cooler than molten metal, preferably employing ultrasonic periodic impact energy of a frequency and magnitude inducing a temporary plasticity zone internally in the metal product induced by internal compression wave patterns near to and inclusive of the welded seam junction thereby to rearrange internal crystalline structure of the welded metal product to produce a patterned grain structure with weld seam junction at the product surface constituting a substantially grainless white layer leading into a stress gradient pattern directed toward an inner base point in the metal body of the workpiece. The resulting metallic grain structure gradient is substantially devoid of internal micro-stress centers that tend to concentrate at grain boundaries and thus eliminates significant grain boundary stress center micro-defects over the gradient range which remains in the workpiece metal after the ultrasonic wave energy is removed and the associated temporary plastic state is terminated.

In this manner illustrated by the aforesaid embodiment, this invention provides a novel method of treating a welded metal product during the initial production process to increase its load bearing life and strength, which has other advantages, features and embodiments as hereinafter suggested in connection with other embodiments of the invention.

Now by reference to FIGS. 3–5, it will be seen that this invention also encompasses novel methods of repairing catastrophic failures such as fractures or cracks in welded products and structures. The nature of such repair methods enable in-situ repairs in some sites as in bridge struts or girders while the bridge remains in active service, with some light traffic flow over the bridge feasible. Furthermore the following repair methods, with little labor cost and modification of surface shape, while using a minimum of specialty tooling, are instrumental in relaxing internal residual stress in the crack area, creation by plastic deformation zones of enhanced strength properties, reduction of internal stress micro-center defects, formation of favorable compression stress regions in a boundary metal layer near a crack and adjacent welded seam junctions, creation of gradient stress patterns extending from weld seams into the base metal to thereby reduce external and internal stresses in welded joints, and reduction or prevention of further crack development and stress fatigue failure in the post-treatment utility life. By further destructive removal of sharp edge structure along the crack and crack-end stress centers additional significant extensions of renewed life expectancy and reduced stress fatigue is also achieved.

Additional improvements are achieved in various sequences of technological operations in the repair process such as the application of ultrasonic impact energy together with welding steps and/or structural alterations of the type hereinafter discussed.

The welded product or structure fragment 15, has appearing therein a fatigue crack 30 with drilled holes 31 at the ends for the purpose of relieving stress and reducing the likelihood of spread or further development of the crack. The chamferred bevels about the top and bottom edges of the holes 31 for removing stress centers at the otherwise sharp edges, are formed preferably by ultrasonic impact energy delivered through a suitable sonic transducer head to structurally alter the welded structure 15, as is also done by drilling the holes 31.

Otherwise in general the ultrasonic pulse wave energy is applied nondestructively to the external surface of the welded body or structure. In this embodiment that area is within the top and bottom rings 33 that identify the critical region at the ends of the cracks in which the relieved stress defects and stress center concentrations can better assure that no further cracks will develop. This is achieved by the induced plasticity from applied UIT to relax and reconfigure the residual stress patterns whether resulting from general stress fatigue or residual stress defects and concentrations that led to the cracking. Thus, as aforesaid, the resulting stress gradient pattern achieves by the compressive impulse treatment of the inner welded product metal the stress gradient configuration with substantially a white layer at the surface leading into the interior base metal region of the welded body 15. As seen from FIG. 4A, an internal metallic plug 34 is inserted loosely into the hole 31 after chamfering the beveled edges 32. Similarly any exposed sharp edges 35, 36 along the crack 30 are beveled to reduce stress concentration zones in the repaired product.

In FIG. 5, the diameter of plug 34 is shown as a, providing the tolerances delta within the drilled out hole walls. The dimension Dmin represents that the drilled holes 31 have the smallest feasible diameter that assures prevention of the spread of the crack. This avoids excessive weakening of the welded body structure. The crack may thereafter be welded and the weld seams treated by the ultrasonic impulse wave energy in the manner aforesaid to optimally distribute stresses about the weld seam.

Figure 7:
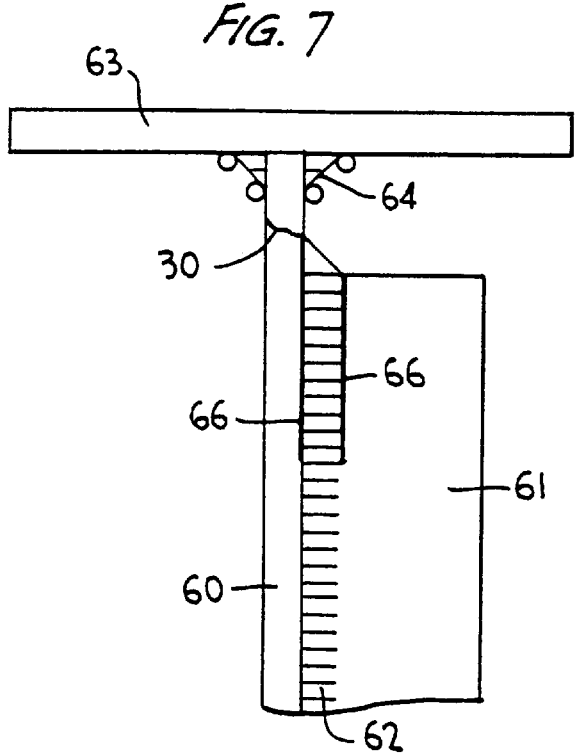
FIG. 7 is a normally disposed diagrammatic end view looking into the the right end of FIG. 6.

In FIGS. 6 and 7, the welded product structure typifies for example a bridge girder or strut in which the region about the repaired crack 30 in girder plate 60 is fortified by structural alteration and further isolated from residual internal stresses, thus serving to increase load bearing strength and life span.

In this embodiment, the strengthener or stiffener plate 61 is welded onto girder plate 60 at the weld seams 62, which abut the crack 30 at the upper end. The top flange 63 is welded to the girder plate at 64. The heavy lines notation 65, 66 indicates the path pattern for application of the ultrasonic pulse energy in the aforesaid manner to relax and redistribute stresses about the weld seams 62, 64. Thus it is seen that on both upper and lower sides of the repaired crack, the original welded product is strengthened both by the addition of plate 61 and by the internal application of the ultrasonic compression pulse energy to plasticize the metal and relax fatigue stress defects and provide the stress gradient pattern that both produces a stronger white layer structure and decreases the possibility of micro-stress defect areas that are distributed about and tend to reduce stress-fatigue life and useful life in conventionally treated weld seam regions.

It is further to be recognized that the technological operations provided by this invention are useful for preventive maintenance during the useful life of welded products to remove fatigue stress defects and to generate white layers of higher strength about weld sites.

Typical ultrasonic generators useful in the methodology of this invention is a 600–900 watt, 25–28 kHz generator producing an oscillation amplitude at the wave guide edge of 25–30 mkm moved in a treatment mode speed at 0.3–0.7 m/min with a manual impact tool. This manual impact tool, with a magnetostriction transducer head, typically has a set of four striking needles.

Typical residual compressive stresses in the surface layer of high strength steel reach 500 MPa to 900 MPa. The ultrasonically cold worked layer in which the distribution of residual stresses occurs reaches a depth up to nearly one mm.

It is to be realized however that the methods of this invention are applicable to many kinds of welded products varying in shape strength and types of utility, and those skilled in the ultrasonic arts can therefore establish the necessary parameters and instruments for carrying out the purposes of the invention.

Having therefore advanced the state of the art, those features of novelty setting forth the nature and spirit of the invention are defined with particularity in the appended claims.

What is claimed is:

1. The method of treatment of a welded structure in the vicinity of weld seams for improving life and load bearing strength, comprising the steps of:

applying ultrasonic energy non-destructively without mechanical deformation of said welded structure at a warm external surface area alongside and spaced from a weld seam on said structure being heated by a concurrently used welding arc a multiplicity of shock pulses of a magnitude and sequential relationship to induce internal plasticity in a region below the external surface of the structure, thereby creating a dynamic treatment zone of plastic material adjacent to said weld seam, inducing by reaction to said shock pulses in said treatment zone a gradient stress pattern between the surface area and a remote location in the welded body with reduced stress concentrations in the vicinity of the surface, and withdrawing the shock pulses in a manner that freezes said gradient stress pattern in place to produce a welded product with higher fatigue strength and load bearing capacity.

2. The method of claim 1 comprising applying said shock pulses in the form of ultrasonic energy with an ultrasonic transducer in contact with said external surface.

3. The method of claim 2 further comprising treating iron and steel products by the step of creating in the gradient stress pattern at said surface area a substantially grain free layer.

4. The method of claim 1 comprising applying the method in an initial production stage of a welded body product to produce a product with higher fatigue strength and higher load bearing strength.

5. The method of claim 1 comprising applying the method in a maintenance stage in the interim life of a welded product in service to relax residual corrosion stresses and to improve fatigue resistance.

6. The method of claim 1 further comprising detecting a stress concentration zone in said welded body, and applying the shock pulse treatment steps to the stress concentration zone to relax the stress and restructure stress patterns in the welded body for greater load bearing capacity.

7. The method of claim 1 further comprising detecting a catastrophic failure region in the welded body structure, and thereafter welding to repair the catastrophic failure with a weld seam before applying said shock pulses in the vicinity of the catastrophic failure region.

8. The method of treatment of a welded structure in the vicinity of weld seams for improving life and load bearing strength comprising the steps of:

applying to an external surface area in the vicinity of a weld seam on said structure a multiplicity of shock pulses of a magnitude and sequential relationship to induce internal plasticity in a region below the external surface of the structure, thereby creating a dynamic treatment zone of plastic material adjacent to said weld seam, inducing by reaction to said shock pulses in said treatment zone a gradient stress pattern between the surface area and a remote location in the welded body with reduced stress concentrations in the vicinity of the surface, withdrawing the shock pulses in a manner that freezes said gradient stress pattern in place to produce a welded product with higher fatigue strength and load bearing capacity, detection of a catastrophic failure region in the welded body structure and thereafter welding to repair the catastrophic failure with a weld seam before applying said shock pulses in the vicinity of the catastrophic failure region, wherein the catastrophic failure comprises a visible crack located on the external surface of the welded body further characterized by the step of mechanically chamfering the lips of the crack and thereafter welding to repair the crack.

9. The method of treatment of a welded structure in the vicinity of weld seams for improving life and load bearing strength, comprising the steps of:

applying to an external surface area in the vicinity of a weld seam on said structure a multiplicity of shock pulses of a magnitude and sequential relationship to induce internal plasticity in a region below the external surface of the structure, thereby creating a dynamic treatment zone of plastic material adjacent to said weld seam, inducing by reaction to said shock pulses in said treatment zone a gradient stress pattern between the surface area and a remote location in the welded body with reduced stress concentrations in the vicinity of the surfaces, withdrawing the shock pulses in a manner that freezes said gradient stress pattern in place to produce a welded product with higher fatigue strength and load bearing capacity, detection of a catastrophic failure region in the welded body structure and thereafter welding to repair the catastrophic failure with a weld seam before applying said shock pulses in the vicinity of the catastrophic failure region, and identifying the end regions of a visible crack located on the external surface of the welded body, and before welding the crack, mechanically drilling small diameter holes in the end regions of the crack for achieving significant reduction in spreading of the crack.

10. The method of claim 9 further comprising the step of mechanically chamfering surface edges of the holes drilled in the end regions of the crack before welding.

11. The method of treatment of a welded structure in the vicinity of weld seams for improving life and load bearing strength, comprising the steps of:

applying to an external surface area in the vicinity of a weld seam on said structure a multiplicity of shock pulses of a magnitude and sequential relationship to induce internal plasticity in a region below the external surface of the structure, thereby creating a dynamic treatment zone of plastic material adjacent to said weld seam, inducing by reaction to said shock pulses in said treatment zone a gradient stress pattern between the surface area and a remote location in the welded body with reduced stress concentrations in the vicinity of the surface, withdrawing the shock pulses in a manner that freezes said gradient stress pattern in place to produce a welded product with higher fatigue strength and load bearing capacity, detection of a catastrophic failure region in the welded body structure and thereafter welding to repair the catastrophic failure with a weld seam before applying said shock pulses in the vicinity of the catastrophic failure region, and welding on the surface area a bracing member adjacent the crack before applying said shock pulses about a weld seam of the bracing member.

12. The ultrasonic impact treatment of a welded metallic product displaying a weld seam and characterized by internal metallic grain structure to reduce internal metal stress patterns within said grain structure thereby to produce a product with high fatigue resistance and high load bearing strength, comprising in combination the steps of:

reducing internal stresses of a welded body by applying near to but spaced from said weld seam a source of ultrasonic impact energy, contacting an external surface of the product with a set of striking needles driven by an ultrasonic transducer emitting head, introducing ultrasound compression wave energy into said product with said emitting head set of striking needles of a frequency and magnitude for temporarily plasticizing an internal region of the product remote from the weld seam and concurrently with welding of the seam to relax residual stress tensions in said metallic grain structure, and removing the ultrasound compression energy to thereby retain a zone wherein the relaxed stress tensions are exhibited by reduced grain structure in said internal region.

13. The ultrasonic impact treatment of a welded metallic product displaying a weld seam and characterized by internal metallic grain structure to reduce internal metal stress patterns within said grain structure thereby to produce a product with high fatigue resistance and high load bearing strength, comprising in combination the steps of:

reducing internal stresses of a welded body by contacting near said weld seam an ultrasonic transducer emitting head having a set of striking needles with an external product surface, non-destructively introducing ultrasound compression wave energy into said product with said emitting head of a frequency and magnitude for temporarily plasticizing a subsurface region of the product extending under the external product surface to relax residual stress tensions in said metallic grain structure, removing the ultrasound compression energy to thereby retain a zone wherein the relaxed stress tensions are exhibited by reduced grain structure in said internal region.

14. The method of removing stress defects formed in a welded metal product, comprising in combination the steps of:

eliminating internal stress micro-damage to metal grain structure by applying ultrasonic impact energy to an external surface of the metal product at a frequency and magnitude extending compression waves internally into the welded product metal from an ultrasonic transducer site in the vicinity of and spaced from a weld seam without incurring substantial surface deformation to create a temporary internal plasticized region relaxing said stress micro-damage, and withdrawing the ultrasonic energy gradually from said transducer site to establish in said region a frozen stress gradient pattern between the weld seam and a base point in the welded product metal having lower internal stress exhibited in the vicinity of the external surface.

15. The ultrasonic impact method of treating a welded metal product concurrently with a welding step forming a welded seam to increase its load bearing life and strength, comprising in combination, the steps of:

inducing at an outer surface site of said welded metal product ultrasonic compression wave energy at an internal product site in the vicinity of said welded seam at a temperature substantially cooler than molten metal, establishing a wave energy frequency and magnitude creating by said ultrasonic compression wave energy a temporary plasticity zone internally in the metal product serving to rearrange crystalline structure of the welded metal product into a pattern of smaller grain structure near the weld seam increasing gradually in grain size as a function of distance from the weld seam to match the residual grain structure of the product metal at a base metal body location spaced from the welded seam, and decreasing the internal ultrasonic wave energy magnitude in a manner establishing a fixed gradient grain pattern with substantially a grain free layer near said outer surface site.

\* \* \* \* \*

UNITED STATES PATENT AND TRADEMARK OFFICE
CERTIFICATE OF CORRECTION

PATENT NO. : 6,171,415 B1
DATED : January 9, 2001
INVENTOR(S) : Efim S. Statnikov It is certified that error appears in the above-identified patent and that said Letters Patent is hereby corrected as shown below:

<u>Column 10, claim 9,</u>
Line 23, "surfaces" should read -- surface --.

Signed and Sealed this

Thirteenth Day of November, 2001

*Attest:*

*Attesting Officer*

NICHOLAS P. GODICI
*Acting Director of the United States Patent and Trademark Office*